(12) United States Patent
Pascu et al.

(10) Patent No.: US 6,424,548 B2
(45) Date of Patent: Jul. 23, 2002

(54) POWER CONVERTER

(75) Inventors: Livin Pascu, Flushing; Boris Sasic, Glendale, both of NY (US)

(73) Assignee: Kepco Company, Flushing, NY (US)

( * ) Notice: Subject to any disclaimer, the term of this patent is extended or adjusted under 35 U.S.C. 154(b) by 0 days.

(21) Appl. No.: 09/727,740

(22) Filed: Dec. 1, 2000

Related U.S. Application Data

(60) Provisional application No. 60/168,571, filed on Dec. 2, 1999.

(51) Int. Cl.$^7$ ................................................. H02M 7/00
(52) U.S. Cl. ......................................................... 363/78
(58) Field of Search .............................. 363/15, 16, 17, 363/65, 74, 78, 84, 95; 323/207, 239, 324

(56) References Cited

U.S. PATENT DOCUMENTS

| | | | | | |
|---|---|---|---|---|---|
| 5,404,092 | A | * | 4/1995 | Gegner | 323/207 |
| 6,163,472 | A | * | 12/2000 | Colby | 363/127 |
| 6,249,108 | B1 | * | 6/2001 | Smedley et al. | 323/207 |
| 6,268,666 | B1 | * | 7/2001 | Bhowmik | 307/72 |

OTHER PUBLICATIONS

Switched–Mode PFC Rectifier with High–Frequency Transformer Link for High–Power Density Single Phase UPS; K. Hirachi, J. Yoshitsuga, K. Nishimura; A. Chibani and M. Nakoaka; Proceedings of the PESC Conference; Jun. 1997, pp. 290–296.

Zero–Voltage–Transistion Isolated PWM Boost Converter For Single Stage Power Factor Correction; J.G. Cho, J.W. Baek, D.W. Yoo, D.I. Song, G.H. Rim; Proceedings of the APEC Conference; Mar. 1997; pp 471–476.

Some Novel Four–Quadrant DC–DC Converters; J. Wang, W.G. Dunford, K. Mauch; Proceedings of the PESC Conference; Jun. 1998; pp. 1775–1782.

A Novel Control Principle of Bi–Directional DC–DC Power Conversion; T. Reimann, S. Szeponik, G. Berger, J. Petzoldt; Proceedings of the PESC Conference; Jun. 1997; pp. 978–984.

Novel Current Mode Bi–directional High–Frequency Link DC/AC Converter for UPS; M. Huang, W. Lin, J. Ying; Proceedings of the PESC Conference; Jun. 1998; pp. 1867–1871.

A Bi–Directional AC–DC Power Converter with Power Factor Correction; S.Y.R. Hui, H. Chung, S.C. Yip; Proceedings of the PESC Conference; Jun. 1998; pp. 1323–1329.

* cited by examiner

Primary Examiner—Adolf Deneke Berhane
(74) Attorney, Agent, or Firm—Hodgson Russ LLP

(57) ABSTRACT

The present invention relates to a bi-directional AC/DC converter having (i) a power stage, (ii) a sourcing control circuit and (iii) a recuperation control circuit. The converter operates with a Power Factor Correction in both directions, i.e. when transferring energy from the AC mains into the DC load as well as when it is transferring energy from an active DC load into the AC mains. Smooth transition between sourcing and recuperation is possible by allowing an active load to control the output voltage until the correct control circuit begins regulation.

26 Claims, 6 Drawing Sheets

POWER CONVERTER

CLAIM OF PRIORITY

This non-provisional patent application claims priority to U.S. provisional patent application Ser. No. 60/168,571, filed on Dec. 2, 1999.

FIELD OF THE INVENTION

The present invention relates, in general, to power conversion and, more specifically, to a bi-directional AC/DC converter and a method of operation of the converter.

BACKGROUND OF THE INVENTION

Applicants are unfamiliar with any AC/DC power supply converter that provide the following characteristics:

1. Provide galvanic isolation between input and output sides of the converter unit;
2. Be able to work with an active load (a load that can sink or source energy, such as battery, for instance), by sourcing energy into the load or sinking energy generated by the load;
3. Recycle energy when working with an active load by returning the energy into the electrical main of the unit; and
4. Provide Power Factor Correction for the line current, regardless if the energy is taken from the mains or recycled into the mains.

Different variations of isolated converters that provide Power Factor Correction have been described in Hirachi et al's article entitled *Switched-Mode PFC Rectifier with High Frequency Transformer Link for High-Power Density Single Phase UPS*, Proceedings of the PESC Conference, June 1997, p. 290–96; Cho et al.'s article entitled Zero-Voltage-Transition Isolated PWM Boost Converter for Single Stage Power Factor Correction, Proceedings of the APEC conference, March 1997, p. 471–76; and Dalal's article 400 W *Single-Stage Current-Fed Isolated Boost Converter with PFC*, Unitrode Power Supply Seminar 1999–00 Series, Manual SLUP002, p. 3.1–3.24. These articles disclose a process to integrate a Power Factor Correction circuit with a DC/DC converter stage to obtain circuits simpler than classic, two-stage approaches (a PFC regulator and DC/DC converter as a separate, basically independent units).

In particular, the Hirachi et al. reference presents an isolated AC/DC/AC converter for use in uninterruptible power systems. Comparison between conventional circuit configurations, which are based on non-isolated boost topologies and proposed solutions, which is basically an isolated boost converter, with a diode bridge and a separate MOSFET bridge on the primary side and a rectifier bridge on the secondary side.

Cho et al. disclose an isolated boost converter consisting of a diode rectifier bridge and a MOSFET bridge on the primary side and a diode bridge of the secondary side with additional circuitry located also on the secondary side, for minimizing switching loss in the AC/DC converter.

Dalal suggest a current fed isolated AC/DC converter topology based on the push-pull converter and typically consisting of a bridge rectifier on the input, center-tapped transformer and two MOSFET switches on the primary side and a diode rectifier bridge on the secondary side of the unit.

However, these articles do not disclose a system that can (1) be able to work with an active load (a load that can sink or source energy, such as battery, for instance), by sourcing energy into the load or sinking energy generated by the load; (2) recycle energy when working with an active load by returning it into the mains; or (3) provide Power Factor Correction for the line current, regardless if the energy is taken from the mains or recycled into the mains.

Furthermore, several solutions for non-isolated topologies (Wang et al. in the article entitled Some *Novel Four-Quadrant DC—DC Converters*, Proceeding of the PESC Conference, June 1998, p. 1775–82;) and an isolated topologies (Reimann et al.'s article entitled *A Novel Control Principle of Bi-Directional DC—Dc Power Conversion*, Proceedings of the PESC Conference, June 1997, p. 978–84; and Huang et al.'s article entitled *Novel Current Mode Bi-directional High-Frequency Link DC/AC Converter for UPS*, Proceedings of the PESC Conference, June 1998, p. 1867–71) capable of transferring energy from the DC source to the DC or AC load and also in the opposite direction (bi-directional power flow) have been presented. The topologies disclosed in those article do not disclose systems capable of (1) recycling energy when working with an active load by returning it into the mains; or (2) providing Power Factor Correction for the line current, regardless if the energy is taken from the mains or recycled into the mains. Moreover, the Wang et al. reference fails to disclose a method for providing galvanic isolation between input and output sides of the unit.

In particular, Wang et al. disclose a family of four topologies capable of operating in all four quadrants. This is a family of non-isolated converters, operating from a DC source and capable of generating both positive and negative polarity of output voltages, in addition to positive and negative output current, as may be directed by the load.

Reimann et al. suggest an isolated DC/DC converter topology capable of controlling energy flow in both directions—from source to load and from load side to the source side of the unit. It is basically an isolated boost topology consisting of two bridges, one on the primary side and the other on the secondary side, each having four quasi-bidirectional switches.

Also, there are products on the market (such as BOP series from KEPCO, Inc.) which are capable of controlling active loads. These products, made by the applicant, lack the ability to (1) recycle energy when working with an active load by returning it into the mains; or (2) provide Power Factor Correction for the line current, regardless if the energy is taken from the mains or recycled into the mains.

Work described in Hui et al.'s article entitled *A Bi-Directional AC-DC Power Converter with Power Factor Correction* (Proceedings of the PESC Conference, June 1998, p. 1323–29) presents a non-isolated topology providing a bidirectional link between AC line and DC source capable of recycling the energy, but it does not provide galvanic isolation between input and output.

As in inventor's knowledge, there has not been unit presented so far that can simultaneously satisfy the following requirements: (1) providing galvanic isolation between input and output sides of the converter unit; (2) be able to work with an active load (a load that can sink or source energy, such as battery, for instance), by sourcing energy into the load or sinking energy generated by the load; (3) recycle energy when working with an active load by returning the energy into the electrical main of the unit; and (4) provide Power Factor Correction for the line current, regardless if the energy is taken from the mains or recycled into the mains.

BRIEF SUMMARY OF THE INVENTION

An isolated, bidirectional AC/DC converter with Power Factor Correction function and capability to recuperate energy into the mains has been invented. It consists of a power stage and a control section. The power stage processes raw power from electrical mains to the power required by the load. The power stage also processes the power generated by an active load and delivers the energy to the mains during the recuperation phase. The power stage has an input filter inductor, at least four bidirectional switches that form a bridge configuration on the primary side of an isolation transformer, the isolation transformer, at least four quasi-bidirectional switches that form a bridge on the secondary side of the isolation transformer and an output filter capacitor.

The control section of the unit regulates the current on the primary side and voltage on the secondary side. The function of the control circuit is to satisfy load requirements and provide Power Factor Correction. The control section has two distinctive parts. The first part controls the unit when the power is being delivered to the load (sourcing). The second part controls the unit when an active load is present and the power gets recycled into the mains (recuperation). Each art of the control section is in control only when needed, which is ensured by utilizing a circuitry that automatically disables itself when conditions for each part to take over are met.

The present invention is capable of satisfying all four requirements of (1) providing galvanic isolation between input and output sides of the converter unit; (2) be able to work with an active load (a load that can sink or source energy, such as battery, for instance), by sourcing energy into the load or sinking energy generated by the load; (3) recycle energy when working with an active load by returning the energy into the electrical main of the unit; and (4) provide Power Factor Correction for the line current, regardless if the energy is taken from the mains or recycled into the mains. The output voltage in the present invention effectively has two levels, one during sourcing, and the other, slightly higher one, during recuperation.

DETAILED DESCRIPTION OF THE INVENTION

Figure 1:
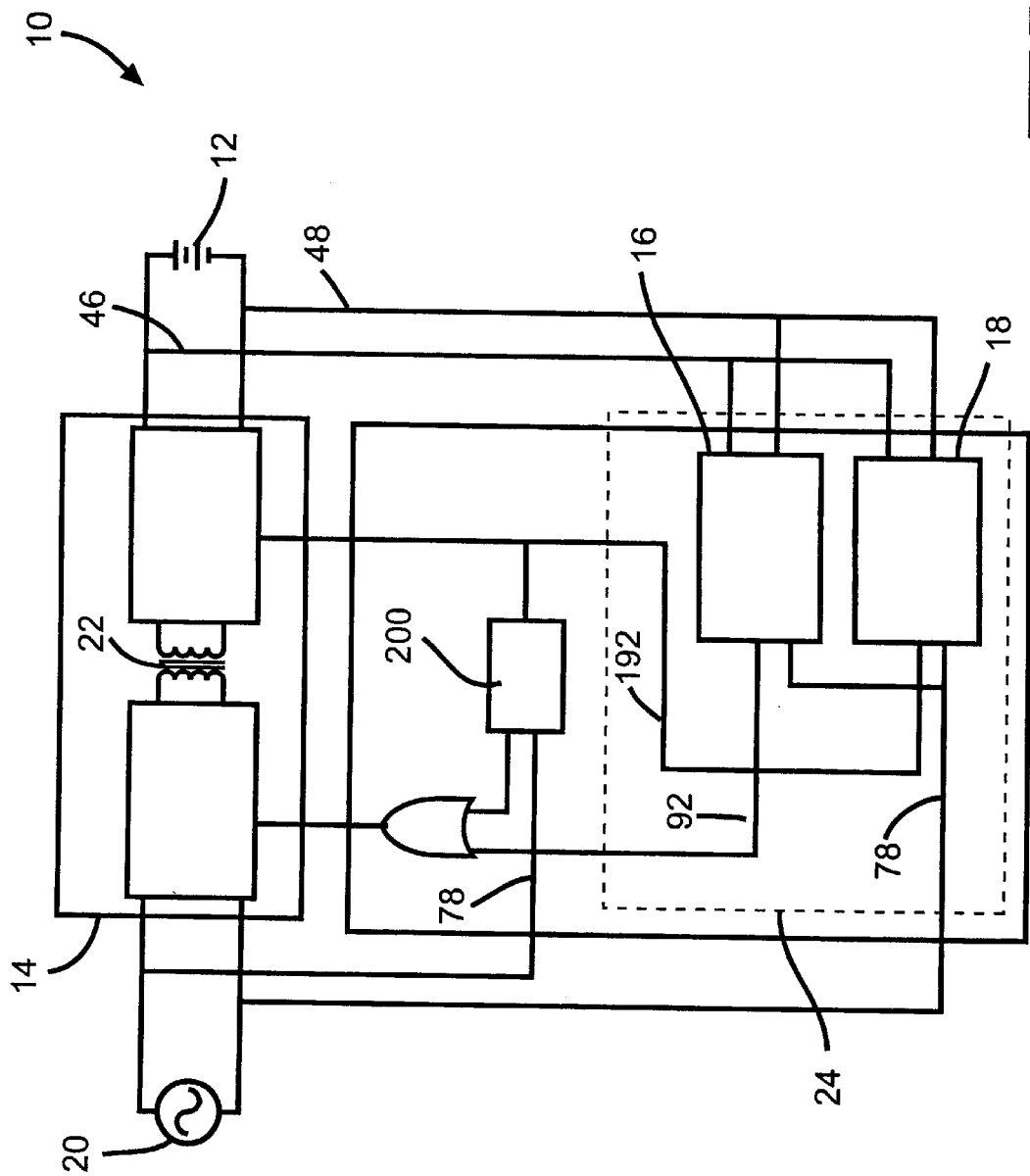
FIG. 1 presents the global block schematic of the invention.

The present invention solves the above-discussed deficiencies of the prior art. The present invention provides a power converter system 10 capable of sourcing power to a load and also capable of recuperating power from an active load 12 (such as battery, for instance) into at least one source of electrical power (hereinafter the "mains"). The system 10 uses a bidirectional power circuit section 14 and at least two control sections 16, 18. The first control section 16 controls the unit 10 during sourcing of the energy. And the second control section controls the unit 10 during recuperation. A global block-schematic depicting the major components of the system 10 are shown in FIG. 1. In FIG. 1, the system 10 has mains 20, the active load 12, power transformer 22 acting as an isolation element, and a control section 24.

Figure 2:
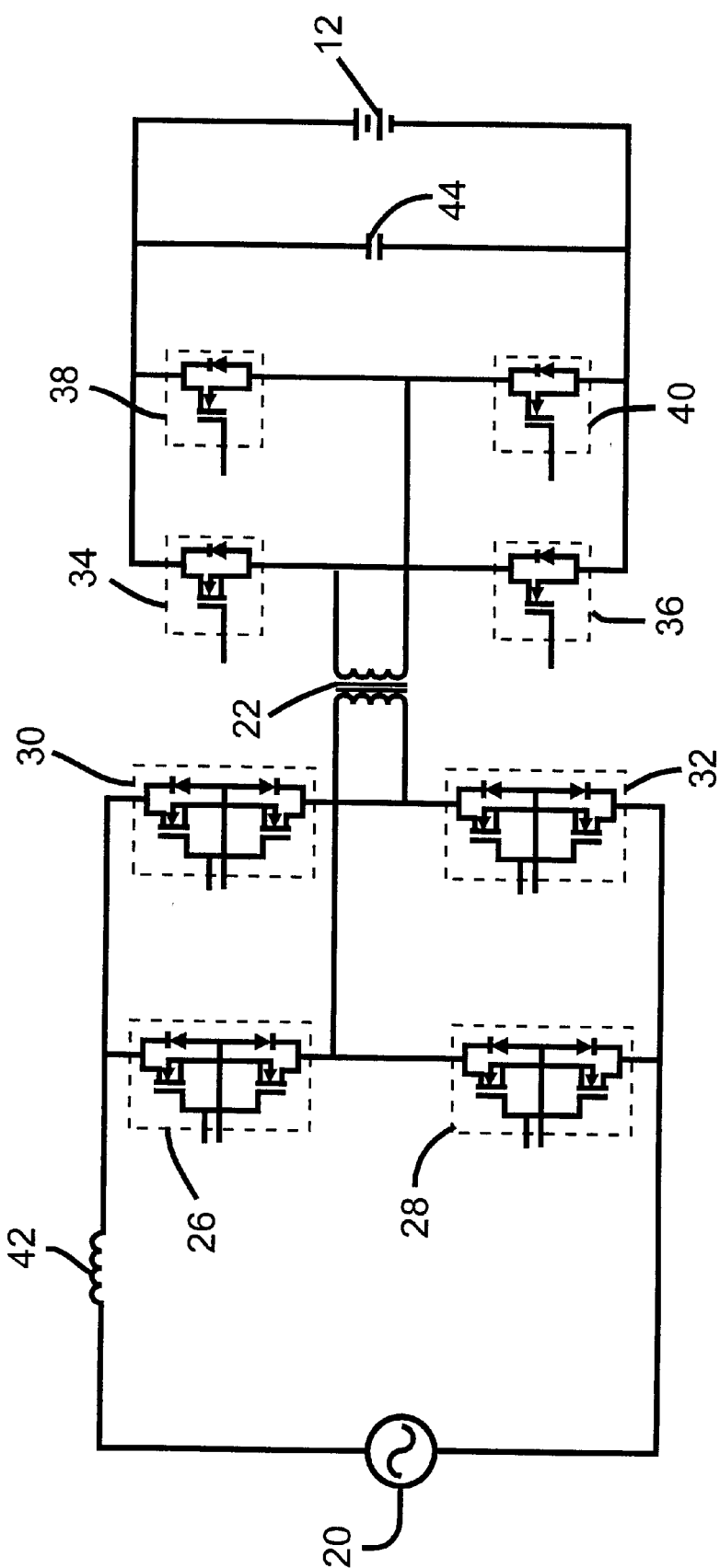
FIG. 2 shows the schematics of the power stage, with all the primary and secondary switches, input inductor and output capacitor.

Power section 14 is presented in greater detail in FIG. 2. First, second, third and fourth bidirectional switches, 26, 28, 30, 32, respectively, are located on the primary side of the isolation transformer 22. In contrast, first, second, third and fourth quasi-bidirectional switches, 34, 36, 38, and 40, respectively, are located on the secondary side of the transformer 22. A first inductor 42 is the input inductor, and an output filter capacitor 44 is shown. The power section 14 illustrated in FIG. 2 is just one embodiment known to those of ordinary skill in the art, since variations of this circuit have been presented in the prior art.

Figure 3:
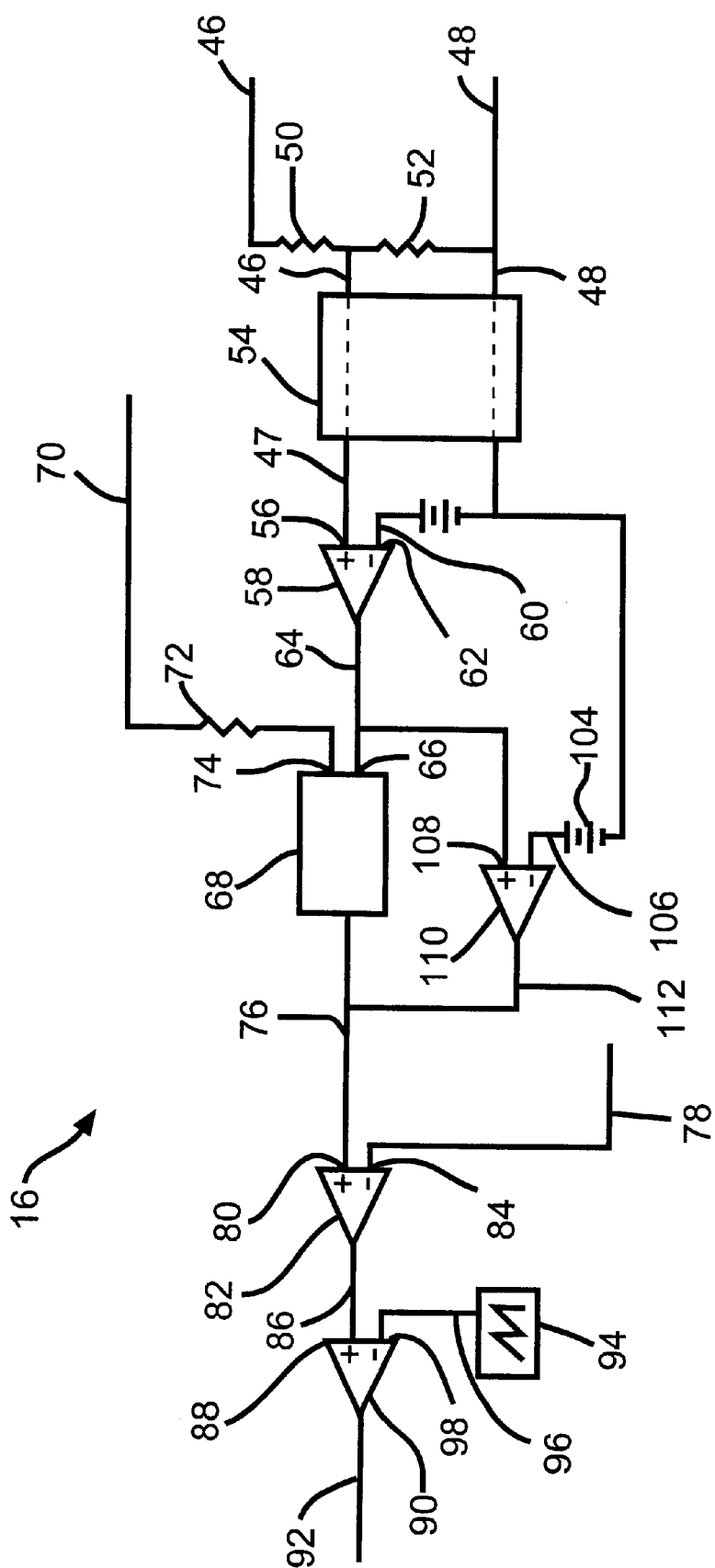
FIG. 3 illustrates a schematic of the sourcing control circuit.

The sourcing control circuit 16, as shown in FIG. 3, is a basic building block of the power factor regulator circuits 10. As such, circuit 16 has also been presented in the prior art. However, its use in the present invention, in conjunction with the recuperation control circuit 18 (shown in FIG. 4) are, as in inventor's opinion, unique and at least one inventive step of the present invention.

SOURCING

The sourcing control circuit 16 (FIG. 3) operates in a controlled manner. An output voltage 46 (positive), 48 (return) is reduced to a lower value by first and second voltage dividers 50, 52. The output voltage 46, 48 is then transferred across an isolation barrier 54 to the primary side of the unit. The isolation barrier 54 can be any conventional component such as an optocoupler or high frequency pulse transformer. From the isolation barrier 54, the output voltage 46 is brought to a negative (inverting) input 56 of a first voltage amplifier 58. A first voltage reference signal 60 connects to a positive (non-inverting) input 62 of the amplifier 58. The first voltage reference 60 together with first and second voltage dividers 50, 52 determine the output voltage 46, 48 of the unit 10.

The first voltage amplifier 58 generates a first output signal 64 that represents an amplified difference between the actual output voltage, 46, 48 (reduced by first and second voltage dividers 50, 52) and a given reference signal 60—the voltage error signal (VES) 64. A first input 66 of a multiplier 68 receives the first output signal 64. While a second input 74 of the multiplier 68 receives an input voltage signal 70 that is transferred to a current by a third resistor 72. This signal represents the template signal for the input current 78 of the unit 10.

The multiplication component 68 generates a current reference signal 76, which an input current 78 will follow, that is always in phase with the input voltage 70, and that has the same shape. Thereby, the unit 10 provides a high power factor (Power Factor Corrected operation). The current reference signal 76 is further used as a reference signal at the positive input 80 of the current amplifier 82, where it gets compared to the actual, measured input current 78 that is brought to a negative input 84 of the amplifier 82. An output of the current amplifier 82 is the current error signal 86, and the signal 86 is fed to one input 88 of a Pulse Width Modulated comparator 90 to generate a Pulse Width Modulated signal 92. A separate oscillator 94 generates a sawtooth signal 96 which is received by a second input 98 of the comparator 90. The resulting PWM signal 92 has a pulse width which is proportional to the value of the current error signal.

The closed loop circuit of the unit 10 operates in such a way that if the output voltage 46, 48 increases for some reason, for example increased input voltage or reduced output load, then the output voltage signal 64 of the voltage amplifier 58 will go in the opposite direction. Multiplication of the voltage signal 64 and the input voltage signal 70 will, therefore, decrease the first multiplier 68 output signal 76 (assuming that AC mains input voltage is constant) and, consequently, the width of the PWM pulses 92 will also be reduced. These pulses 92 directly control the first, second, third and fourth bidirectional switches, 26, 28, 30, 32. With this control, the pulses 92 reduce the input current 78 and, consequently the output voltage 46, 48, effectively canceling increase in the voltage. If the output voltage 46, 48 decreases, the circuit 10 operates in opposite manner, thus increasing input current 78 and output voltage 46, 48, again canceling any disturbances.

TRANSITION FROM SOURCING TO RECUPERATION

If an active load 12 is connected to the output of the unit 10 and the load 12 starts delivering energy into the unit 10, the output voltage 46, 48 will start increasing. The sourcing control circuit 16 will try to lower the output voltage 46, 48, as described above. Voltage error signal 64 will start decreasing. At some point the VES 64 will reach the level set by a second voltage reference signal 106 created by the second voltage reference 104. When VES 64 becomes slightly lower than the second voltage reference signal 106 at one input 108 of a shut-down comparator 110, the comparator's output signal 112 will become zero and it will pull down the multiplier's 68 output 76 disabling it effectively. At that instant the PWM pulses 92 will cease and the unit's 10 output voltage 46, 48 will be controlled by the active load 12 only.

RECUPERATION

Figure 4:
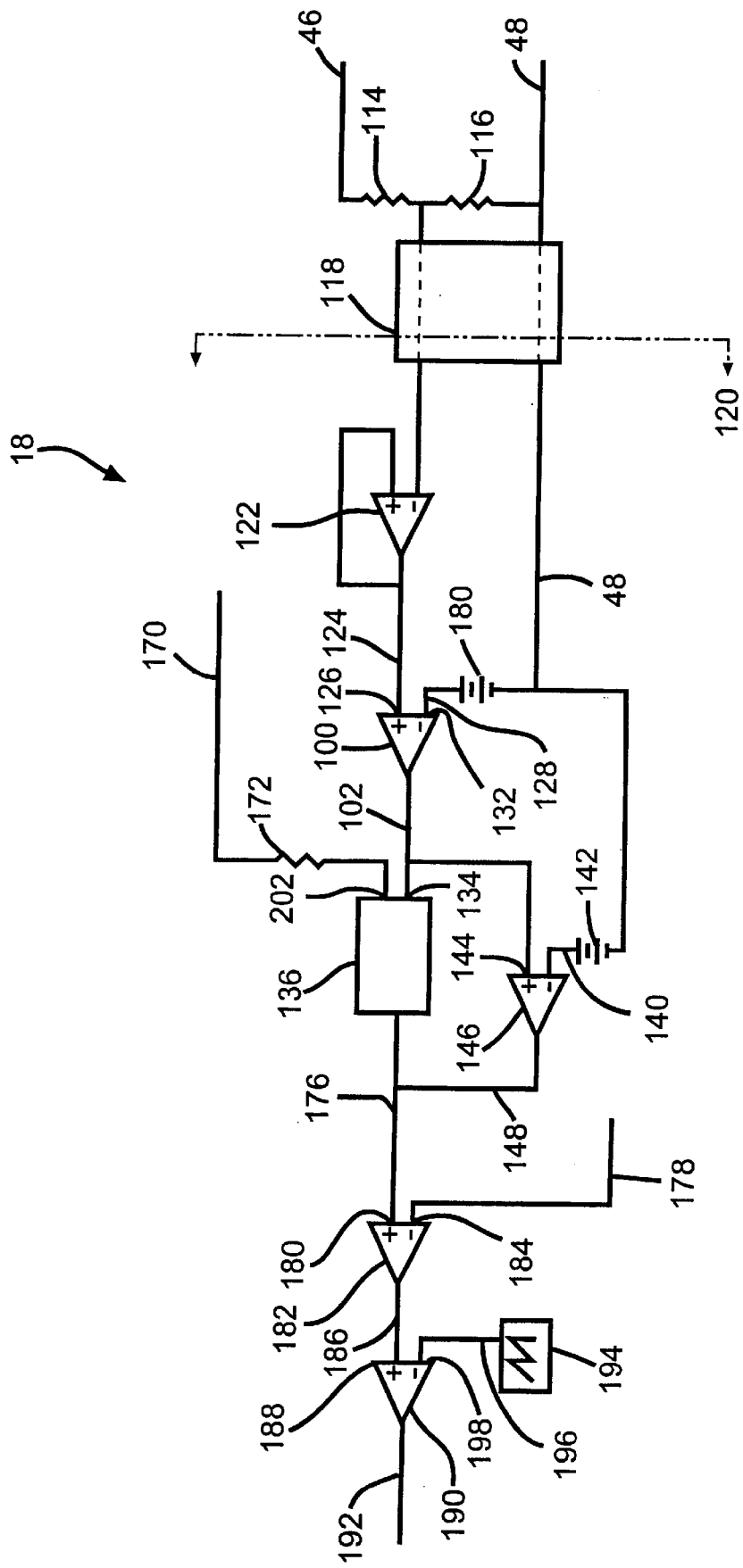
FIG. 4 illustrates a schematic of the recuperation control circuit.

With control circuits 16, 18 out of function, the output voltage 46 will continue increasing. The output voltage 46 is reduced by fourth and fifth voltage dividers 114, 116 in the recuperation control circuit 18 (FIG. 4). The output voltage 46 is then directed to a second isolation barrier 118, same type as described for the first isolation barrier 54. On the primary side 120 of the isolation barrier 118, the voltage 46 is fed to an inverting amplifier 122 with a gain of 1. The inverting amplifier 122 generates an inverting signal 124. The inverting signal 124 is directed to a first input 126 of a voltage amplifier 100. In the voltage amplifier 100, the inverting signal 124 is compared to a third reference signal 128. The third reference signal 128 is generated by reference voltage 130. The voltage amplifier 100 receives the third reference signal though a second input 132. The resulting signal of the voltage amplifier 100 is an amplifier signal 102.

Amplifier signal 102 is transmitted to a first input 134 of a second multiplier 136. The second multiplier 136 receives at a second input 202 an input voltage signal 170 that is transferred to a current by a third resistor 172. This signal represents the template signal for the input current 178 of the unit 10.

The multiplication component 136 generates a current reference signal 176, which an input current 178 will follow, that is always in phase with the input voltage 170, and that has the same shape. Thereby, the unit 10 provides a high power factor (Power Factor Corrected operation). The current reference signal 176 is further used as a reference signal at the positive input 180 of the current amplifier 182, where it gets compared to the actual, measured input current 178 that is brought to a negative input 184 of the amplifier 182. An output of the current amplifier 182 is the current error signal 186, and the signal 186 is fed to one input 188 of a Pulse Width Modulated comparator 190 to generate a Pulse Width Modulated signal 192. A separate oscillator 194 generates a sawtooth signal 196 which is received by a second input 198 of the comparator 190. The resulting PWM signal 192 has a pulse width which is proportional to the value of the current error signal.

Figure 5:
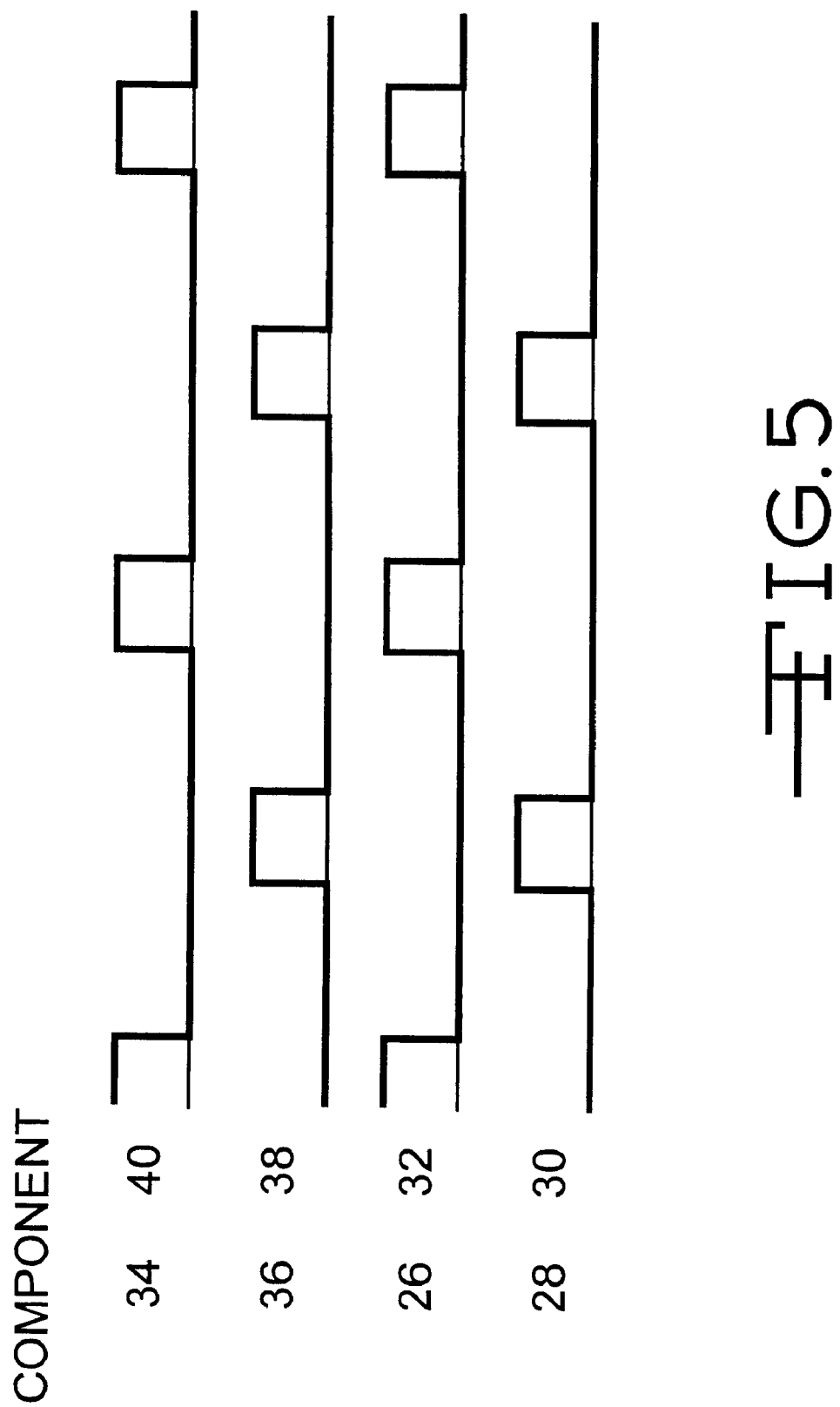
FIG. 5 shows driving signals for the main and secondary switches during recuperation for positive half-period of the input line voltage.
Figure 6:
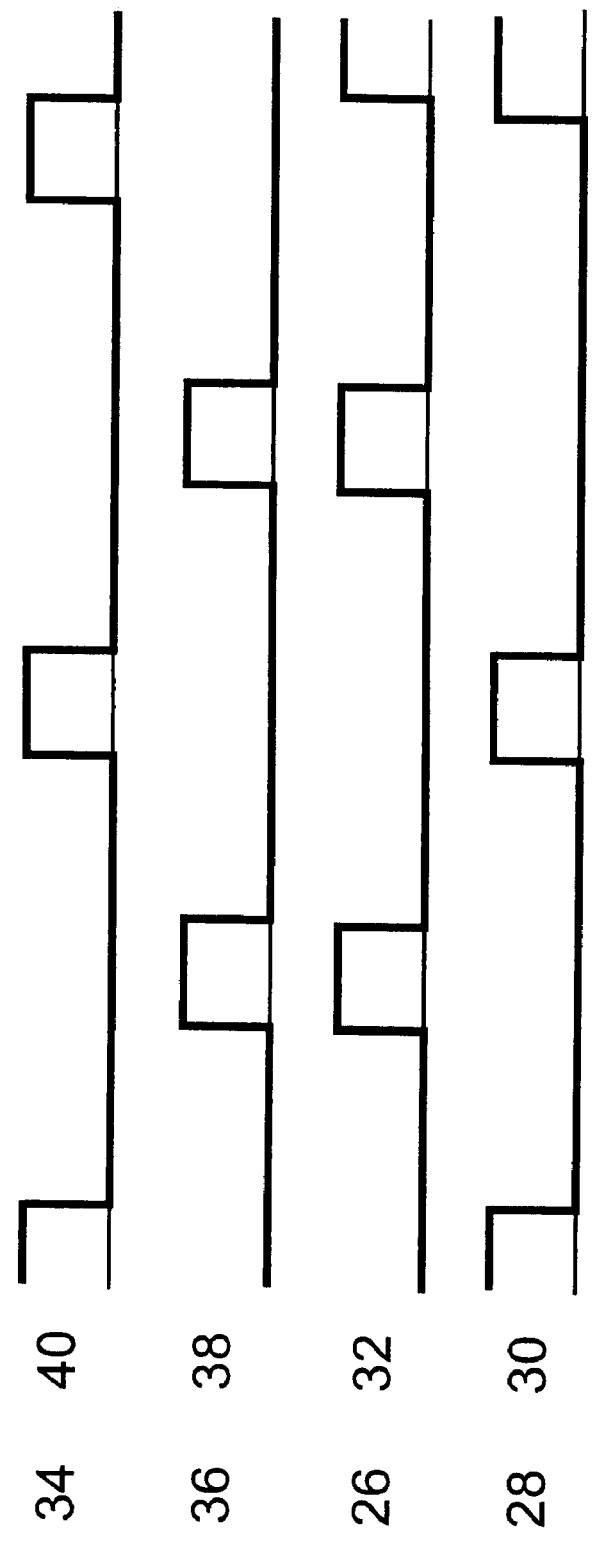
FIG. 6 shows driving signals for the main and secondary switches during recuperation for negative half-period of the input line voltage.

When the output voltage 46, 48 increases, the voltage output 124 of the inverting amplifier 122 will decrease until it reaches a level set by the reference signal 128. When it falls slightly below the reference signal 128 level, voltage error signal (VES)102 at the output of the voltage amplifier 100 will increase. When the signal 102 goes above the level set by a fourth reference signal 140, which is generated by reference voltage 142, then shut-down comparator 144 will change the comparator output signal 146 from low to high and current reference signal 176 will not be tied to zero through diode 148 anymore. Thereby, the voltage amplifier's output 102, multiplied by the input voltage signal 170 will result, similarly to the sourcing control circuit 16, in increased width of the PWM pulses 192. In difference to the sourcing control 16, the recuperation control circuit 18 directly controls first, second, third and fourth quasi-bidirectional switches, 34, 36, 38, and 40, with primary switches being indirectly controlled through a conventional synchronization circuit 200 (shown in FIG. 1). Returning to FIG. 4, the increased pulse width will, therefore, transfer more energy being taken from the active load 12, which will decrease the output voltage 46, 48, and keep it regulated. The Synchronization circuit 200, used to drive secondary switches 34, 36, 38, and 40, has two different patterns, one for positive half-period of the input voltage as shown in FIG. 5, and one for the negative half-period, as shown in FIG. 6.

If the active load 12 stops delivering energy into the unit 12, output voltage 46, 48 will start decreasing, inverting amplifier's output voltage 124 will start increasing, voltage error signal 102 will start decreasing, and eventually it will reach the level of set forth by reference signal 140, which will disable the current reference 176 and PWM signals 192 will cease. The output voltage 46, 48 will stay uncontrolled until it reaches the level of reference signal 60 (FIG. 3), at which point the sourcing control 16 will become active again and it will start regulating the output voltage 46, 48.

While preferred embodiments of the present invention have been disclosed, it will be appreciated that it is not limited thereto but may be otherwise embodied with the scope of the following claims.

We claim:

1. A galvanically isolated bi-directional AC/DC converter comprising (1) a bi-directional power stage that processes energy (a) from an AC utility power grid to a passive DC load and (b) generated by an active DC load to the AC utility power grid during a recuperation phase, and (2) a control circuit having a sourcing control section and a recuperation control section.

2. The bi-directional AC/DC converter of claim 1 wherein the power stage has an input filter inductor, at least four bi-directional switches that form a bridge configuration on a primary side of an isolation transformer, the isolation transformer, at least four quasi-bi-directional switches that form a bridge on a secondary side of the isolation transformer and an output filter capacitor.

3. The bi-directional AC/DC converter of claim 2 wherein the control circuit regulates the current on the primary side and voltage on the secondary side.

4. The bi-directional AC/DC converter of claim 1 wherein the control circuit satisfies load requirements and provide a Power Factor Correction.

5. The bi-directional AC/DC converter of claim 1 wherein the sourcing control section controls the converter when power is being delivered to a load.

6. The bi-directional AC/DC converter of claim 1 wherein the recuperation control section controls the converter when an active load is present and power gets recycled into electrical mains.

7. The bi-directional AC/DC converter of claim 1 wherein the recuperation control section and the sourcing control section each operates only when needed.

8. The bi-directional AC/DC converter of claim 7 wherein the recuperation control section and the sourcing control section each has circuitry that automatically disables each section when electrical circuit conditions are met.

9. The bi-directional AC/DC converter of claim 1 wherein the converter provides galvanic isolation between an input side and an output side of the converter unit.

10. The bi-directional AC/DC converter of claim 9 wherein the converter is able to work with an active load by sourcing energy into the load or sinking energy generated by the load.

11. The bi-directional AC/DC converter of claim 9 wherein the converter recycles energy when working with an active load by returning the energy into an electrical main.

12. The bi-directional AC/DC converter of claim 9 wherein the converter provides Power Factor Correction for a line current, regardless if the energy is taken from the mains or recycled into the mains.

13. The bi-directional AC/DC converter of claim 7 wherein the converter output voltage has two levels, the first output voltage level during sourcing, and the second output voltage level slightly higher than the first output voltage level during recuperation.

14. A method of automatic transition, in a galvanically isolated bi-directional AC/DC converter having (1) a bi-directional power stage that processes energy (a) from an AC utility power grid to a passive DC load and (b) generated by an active DC load to the AC utility power grid during a recuperation phase, and (2) a control circuit having a sourcing control section and a recuperation control section, between the sourcing control section and the recuperation control section comprising the steps of:

allowing an output voltage to become controlled by an active load only; and altering the output voltage to a higher or lower value to enable the control circuit to start regulating the output voltage.

15. The method of claim 14 wherein the power stage has an input filter inductor, at least four bi-directional switches that form a bridge configuration on a primary side of an isolation transformer, the isolation transformer, at least four quasi-bi-directional switches that form a bridge on a secondary side of the isolation transformer and an output filter capacitor.

16. The method of claim 15 wherein the control circuit regulates the current on the primary side and voltage on the secondary side.

17. The method of claim 14 wherein the control circuit satisfies load requirements and provide a Power Factor Correction.

18. The method of claim 14 wherein the sourcing control section controls the converter when power is being delivered to a load.

19. The method of claim 14 wherein the recuperation control section controls the converter when an active load is present and power gets recycled into electrical mains.

20. The method of claim 14 wherein the recuperation control section and the sourcing control section each operates only when needed.

21. The method of claim 20 wherein the recuperation control section and the sourcing control section each has circuitry that automatically disables each section when electrical circuit conditions are met.

22. The method of claim 14 wherein the converter provides galvanic isolation between an input side and an output side of the converter unit.

23. The method of claim 14 wherein the converter is able to work with an active load by sourcing energy into the load or sinking energy generated by the load.

24. The method of claim 14 wherein the converter recycles energy when working with an active load by returning the energy into an electrical main.

25. The method of claim 14 wherein the converter provides Power Factor Correction for a line current, regardless if the energy is taken from the mains or recycled into the mains.

26. The method of claim 20 wherein the converter output voltage has two levels, the first output voltage level during sourcing, and the second output voltage level slightly higher than the first output voltage level during recuperation.

* * * * *

UNITED STATES PATENT AND TRADEMARK OFFICE
CERTIFICATE OF CORRECTION

PATENT NO.     : 6,424,548 B2
DATED          : July 23, 2002
INVENTOR(S)    : Liviu et al.

It is certified that error appears in the above-identified patent and that said Letters Patent is hereby corrected as shown below:

<u>Title page,</u>
Item [75], Inventor, "Livin" should be -- Liviu --

Signed and Sealed this

Eleventh Day of February, 2003

JAMES E. ROGAN
*Director of the United States Patent and Trademark Office*